INVENTORS
WILLIAM H. CARRIGAN
JAMES A. MACLAM

ATTORNEYS

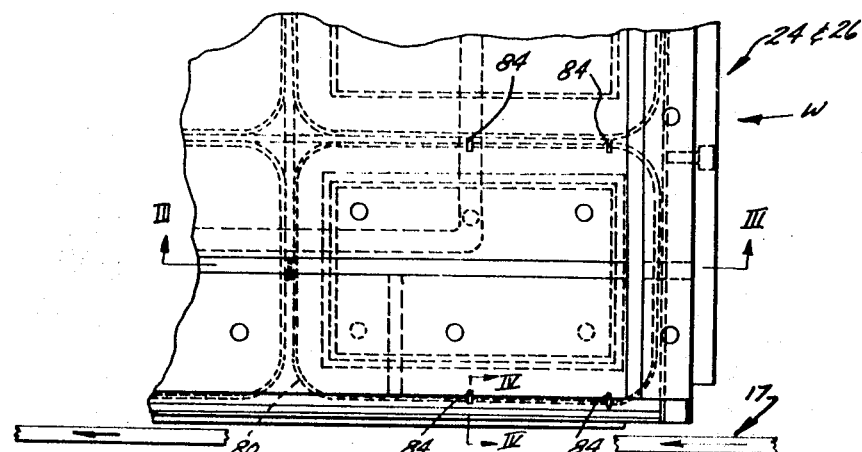
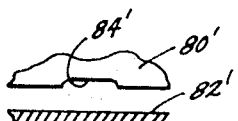
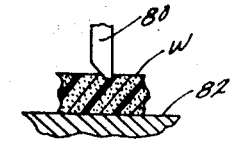
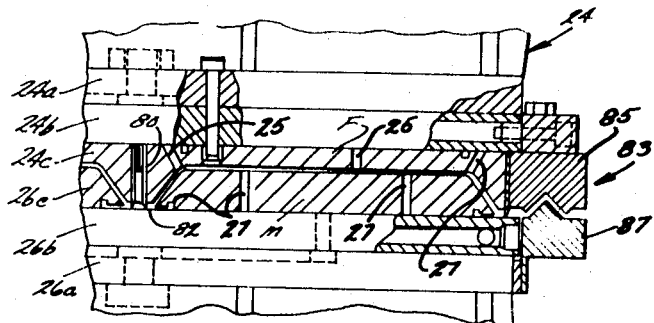
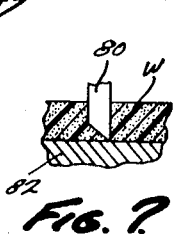
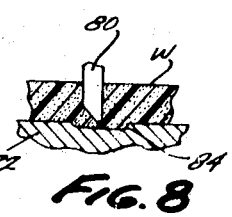
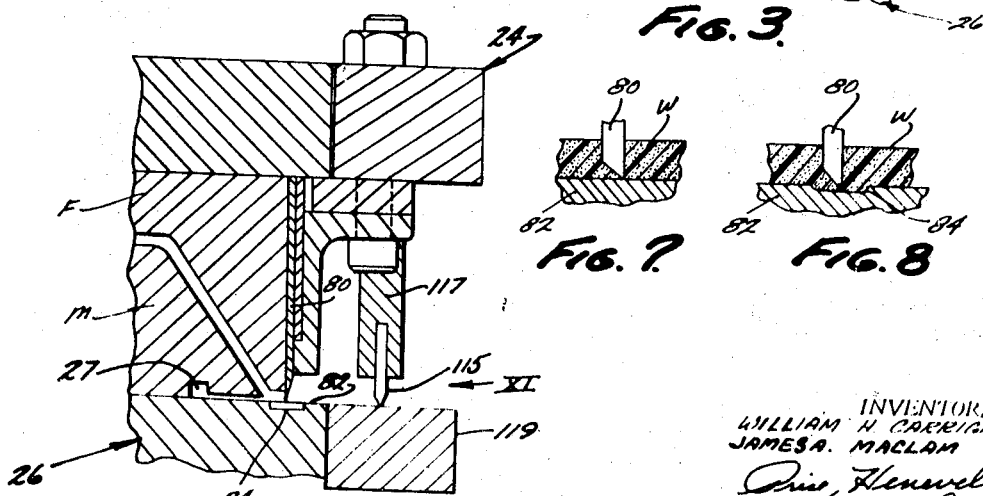

Oct. 12, 1971    W. H. CARRIGAN ET AL    3,611,500

SHEET FORMING APPARATUS

Original Filed Oct. 1, 1968    3 Sheets-Sheet 3

INVENTORS
WILLIAM H. CARRIGAN
JAMES A. MACLAM
BY
ATTORNEYS

United States Patent Office 3,611,500
Patented Oct. 12, 1971

3,611,500
SHEET FORMING APPARATUS
William H. Carrigan, Croton, and James A. Maclam, Comstock Park, Mich., assignors to Gloucester Engineering Co., Inc., Gloucester, Mass.
Original application Oct. 1, 1968, Ser. No. 764,128, now Patent No. 3,518,334, dated June 30, 1970. Divided and this application Jan. 16, 1970, Ser. No. 8,137
Int. Cl. B29c 17/02, 17/14, 3/04
U.S. Cl. 18—19 R
9 Claims

ABSTRACT OF THE DISCLOSURE

Method and apparatus of forming three dimensional articles such as trays into plastic web stock by heat and pressure, especially in foam type web stock, peripherally cutting the articles while still in the forming equipment for separation from the web but leaving tabs holding the articles to the web matrix, while also forming a special relief pleat, with hinges, in the web and/or causing special relief slits in the web, to prevent subsequent shrinkage and tension stresses in the web matrix from causing the articles to prematurely break loose from the matrix or to be shifted out of proper orientation or registration.

RELATED U.S. APPLICATION

This is a divisional application of parent application Ser. No. 764,128, filed Oct. 1, 1968, now U.S. Patent No. 3,518,334, and entitled Sheet Forming Apparatus.

BACKGROUND OF THE INVENTION

This invention relates to a method and apparatus for forming three dimensional articles such as trays or the like, in generally continuous plastic web stock, especially the foam type, and preparing such articles for separation from the web, and more particularly to such a method and apparatus capable of achieving such results in a manner that enables the articles to be retained in accurate orientation and registration in the web matrix during advancement out of the forming equipment, for reliable stacking or the like.

In recent years, two-stage equipment capable of forming three dimensional articles by pressure differential into plastic web stock in the first stage, and creasing such articles in the second stage, both in the forming press, for subsequent separation from the web matrix, have been developed and marketed by the assignee herein. Such is broadly set forth in U.S. Patents 3,166,790 and 3,190,946. Initially, most of the work and production were performed on conventional thermoplastic web material.

Subsequently, the equipment was modified and a method was developed for foam type plastic web stock. Such is shown in U.S. Patents 3,359,600; 3,340,574; and 3,348,-748. The preferred method for foam stock utilizes, in the second stage, peripheral cutting around each article clear through the web while leaving spaced, compressed retention tabs between the articles and the web matrix, rather than peripheral creasing as with ordinary web stock. Such is set forth in copending patent application Ser. No. 663,774, filed Aug. 28, 1967, now abandoned, and entitled Foam Sheet Forming Press and Method. This is because the foam articles, when peripherally creased and not cut clear through, do not subsequently readily break out of the web for dependable separation when the foam articles are almost completely peripherally severed, except for the compressed tabs, they do readily break out of the matrix when the latter is conducted around an edge or bend, particularly past a separating surface. Such equipment is capable of forming and separating articles at rapid rates. This high speed production necessitates automatic high speed stacking for efficient operation. Automatic high speed stacking of foam articles has presented problems, however. Too frequently, the individual separated three dimensional foam articles, such as trays, are not in proper registry and/or orientation for stacking, so that crushing of the fragile articles, jamming of equipment, etc., is experienced. Further, the individual foam articles too frequently tend to partially break loose from the web matrix, by breaking of one or more tabs, while still in the forming equipment. This often causes one or more edges of the articles to protrude objectionably from the matrix to prevent dependable, oriented, article advance through the equipment. Careful analysis has shown this to be due to stresses in the web exerted upon opening of the press.

SUMMARY OF THE INVENTION

It is an object of this invention to provide a novel forming method and apparatus capable of forming three dimensional articles such as trays into a web, even a foam type web, and substantially peripherally cutting such in the forming equipment, except for tabs, to enable subsequent separation from the web matrix, while uniquely conditioning the web to tensile stress to prevent subsequent retraction or shrinkage of the web from prematurely breaking articles loose from the web matrix in the forming equipment and/or causing loss of article registry and/or orientation. The articles are thus dependably advanced from the forming equipment, in proper position, without fouling the equipment and to be subject to dependable automatic stacking or other handling.

The trailing zone of each web portion being formed by pressure differential techniques is conditioned by the formation of a special stress relief pleat into it during the pressure differential forming step. The pleat provides tension stress absorbing flexibility. It preferably has a three hinge axis structure formed directly into the web by a combination three dimensional formation of the pleat and compression of the pleat edges or apices into bendable hinge joints. Also, the gripping action of the pleat forming members maintain the web being formed under control without distortion longitudinally during article formation. The pleat structure is particularly advantageous transversely across the rear edge of the web portion. The side edges may also be conditioned in this fashion.

However, the side edges of the web can be conditioned by spaced slits cut by blades longtudinally of the web between the forming dies and the web gripping and advancing elements e.g. chains. This supplements the pleat action along the rear edge. The blades are mounted to move with the dies, to function as cutting members during peripheral cutting of the articles.

Briefly then, the structure comprises forming die means having two-stage forming and cutting facility, combined with stress relieving conditioning means, the latter comprising transverse hinged pleat forming means across the trailing zone of the web portion being formed and preferably including longitudinal means along the opposite side edge zones of the web section being formed.

These and other objects, advantages, and features of the inventive method and apparatus will become apparent from the specification and drawings.

BRIEF DESCRIPTION OF THE DRAWINGS

FIG. 2 is an enlarged fragmentary plan view of the platen assembly in the apparatus of FIG. 1;

FIG. 3 is a sectional view of the assembly in FIG. 2, taken on plane III—III;

FIG. 4 is a further enlarged sectional fragmentary view of the assembly in FIG. 2, taken on plane IV—IV;

FIG. 5 is a sectional enlarged view of an alternative article sealing and cutting blade and cooperative surface, for the apparatus in FIG. 4;

FIG. 6 is a sectional enlarged view showing the first, sealing step of the method;

FIG. 7 is a sectional enlarged view showing the second, article cutting step of the method;

FIG. 8 is a sectional, enlarged view showing the second step of the method at each peripheral recess around each article formed;

DESCRIPTION OF THE PREFERRED EMBODIMENT

Figure 1:
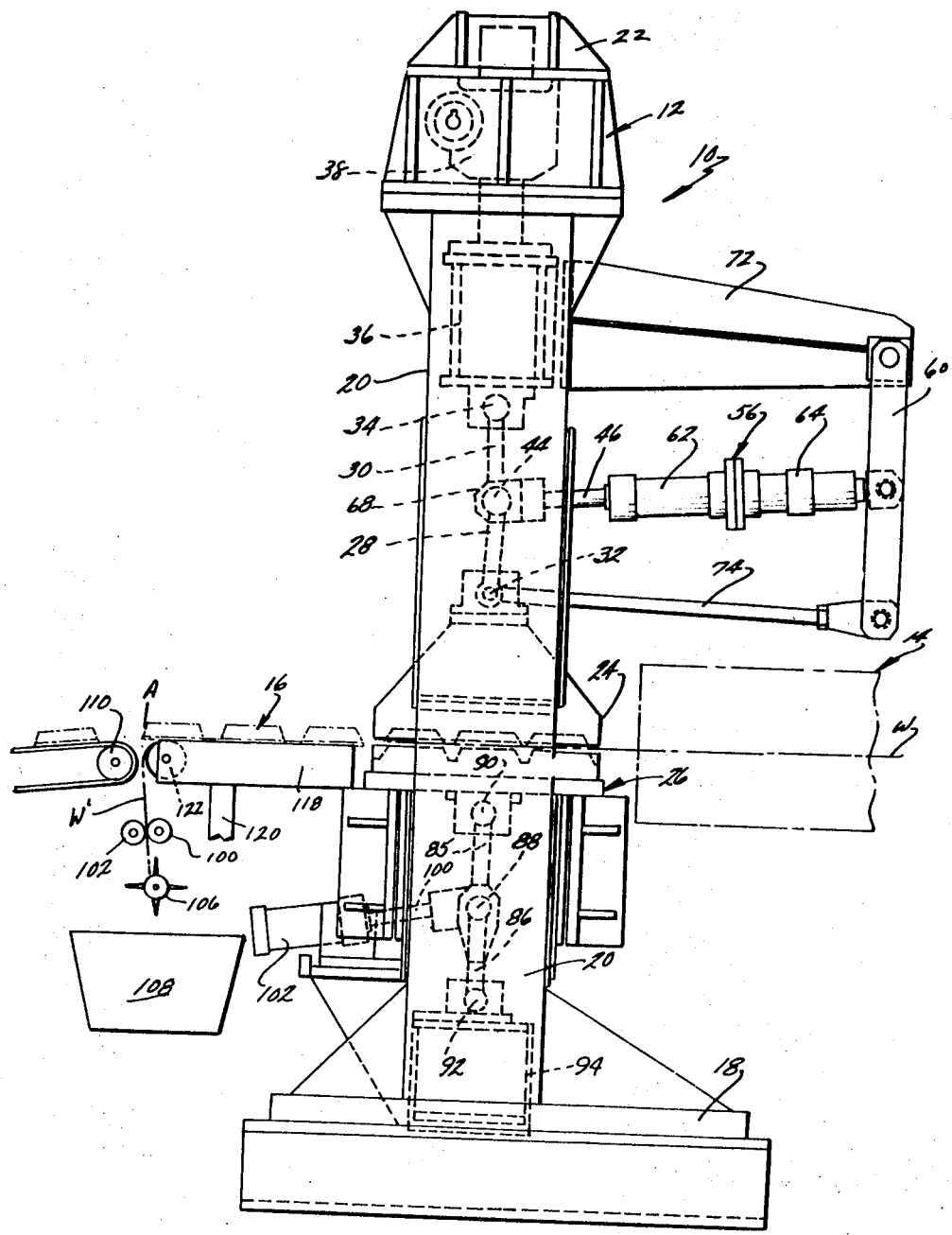
FIG. 1 is a side elevational view of forming apparatus employing the invention.
Figure 9:
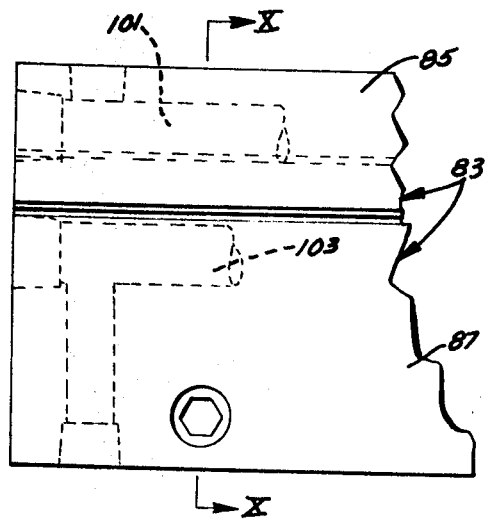
FIG. 9 is a fragmentary, enlarged, side elevational view of the portion of the platen assembly adjacent the rear edge thereof i.e. adjacent the trailing edge of each web section being formed (i.e. the right end of the apparatus illustrated in FIG. 2)

Referring now specifically to the drawings, the apparatus 10 includes a forming press subassembly 12, preferably a preheat oven subassembly 14, and a press discharge and article breakout subassembly 16.

The basic structure of the forming press subassembly 12 is similar to that disclosed in U.S. Pat. 3,340,574, entitled Universal Forming Press. It includes a frame structure which may comprise a base support footing 18, a pair of spaced upright pillars 20 extending upwardly from the footing and interconnected at the upper ends by a rigid cross beam 22. Mounted to this framework is the forming apparatus which includes an upper platen mechanism 24 and a lower platen mechanism 26. The upper platen is suspended from the upper cross beam 22 and more specifically on a toggle linkage which includes a lower plate type link 28 which is pivotally connected at its upper end to an upper plate type link 30. The lower link is pivotally connected on its lower end to a transverse horizontal shaft 32 pivotally securing it to the upper platen 24. Upper link 30 is pivotally connected on the horizontal transverse pivot shaft 34 to a vertically adjustable carriage 36. This carriage is vertically adjusted by a screwdrive assembly 38 from which it is suspended. Toggle links 30 and 28 are pivotally interconnected by a shaft 44, to which is also pivotally connected the extended end of a piston rod 46 extending from the dual, back-to-back hydraulic cylinder means 56 which has its opposite end pivotally connected to link 60 of a stabilizer linkage. Fluid cylinder 56 has a piggy-back double cylinder arrangement with the back ends of the first cylinder 62 and the second cylinder 64 affixed together. Cylinder 64 has its piston rod 70 extending in the opposite direction as cylinder 62, to a pivotal connection at the center of link 60. Link 60 is pivotally mounted on its upper end to the outer end of a rigid cantilever beam 72 mounted to carriage 36. The lower end of link 60 is pivotally connected to a rod 74 that extends back to its pivotal connection on the lower shaft 32 of the toggle linkage of the upper platen. This stabilizer linkage absorbs the horizontal component of the thrust exerted by the lower plate type link 28 of the toggle linkage against shaft 32, thus stabilizing the upper platen by allowing only the vertical component of the thrust of link 28 to act upon it. Extension of the first cylinder 62 of the back-to-back arrangement causes the toggle linkage to almost but not quite straighten to a straight line position of the links. Extension of the second cylinder 64 causes final shifting of the toggle linkage to its most extended upright linear position for the last portion of the upper platen stroke in a manner to be specifically described hereinafter.

The lower platen assembly can be either fixed into position or movable under the influence of a toggle linkage and fluid cylinder assembly also. Its toggle linkage includes an upper toggle link 85 pivotally connected on a transverse shaft 88 to a lower toggle link 86. The lower end of lower toggle link 86 is pivotally connected on a parallel shaft 92 to a lower base 94. The upper end of toggle link 85 is pivotally connected on a shaft 90 to the underside of lower platen means 26. A fluid cylinder 102 is pivotally mounted to the lower base assembly, and has its extended piston rod pivotally connected at shaft 88 between the two toggle links. Thus, extension of cylinder 102 causes elevation of the lower platen, while retraction thereof causes lowering of the lower platen.

The upper and lower platens cooperate to cause dies thereon to interfit closely for the formation of articles therebetween in a manner to be described hereinafter. The actual die members in the lower and upper platens may be replaceable by other selected dies with releaseable retention means. The dies preferably are matching dies with cooperating interfitting members having respective male and female portions for forming articles with physical pressure differential as well as pneumatic pressure differential, as shown. In some instances, however, only one of the die members may have a configurated face with the other one being a flat face capable of applying pneumatic pressure to the web being formed.

The web W illustrated in phantom is normally, when using this equipment, a foam type web of expanded, cellular polystyrene, polyvinyl, polyethylene or generally equivalent materials, normally having closed outer surfaces due to their nature or method of formation. This web is preferably preheated in an oven assembly 14 shown in schematic outline form prior to entry into the forming press. This oven assembly is of the type illustrated and claimed in U.S. Pat. 3,359,600 entitled Sheet Preheating and Forming Method and Apparatus and assigned to the assignee herein. Alternatively or additionally, the web may be heated by heated die members. If desired, the web W may be a non-foam type, although the novel apparatus and method have been found to be particularly suited to handle foam type web stock. Web gripping and advancing means 17 along the opposite side edges of the web are employed to intermittently feed the web through the oven and press. Such apparatus may be continuous roller chain mechanisms shown for example in U.S. Pat. 3,359,600 noted above. This is in addition to the web pulling rolls 100 and 102 downstream of the forming press to help pull the formed articles and surrounding web matrix from the press, and forming a portion of subassembly 16 as described hereinafter.

The discharge and article break out subassembly 16 includes a web and article discharge guide surface 118 at the discharge area of the press, and supported by suitable support means such as legs 120. At the discharge end of guide surface 118 is an arcuate web matrix guide surface preferably formed by part of a rotational transversely extending cylindrical roller 122 around which the web matrix W' passes in a non-linear path to interengaging, web squeezing, rotating, pulling rolls 100 and 102. These pull the web and articles from the press and feed the scrap web matrix W' to a rotating bladed chopper 106 which cuts the matrix into pieces dropped into a suitable receptacle 108. The three dimensional, configurated, formed foam plastic articles A such as trays are broken out of the web matrix at roller 122 by use of the non-linear travel in combination with a separating surface which may be in the form of a recirculating conveyor belt or powered rollers 110 which extend between this discharge apparatus and a stacker subassembly or the like (not shown). The actual break out function will be described in more detail hereinafter.

Reference is now made to FIGS. 2 through 4 with respect to the platen and die structure there illustrated in fragmentary form. In FIG. 2, the cooperative platen units are shown in plan form. The cross section of this assembly is illustrated in FIG. 3, with an enlarged fragmentary cross section being shown also in FIG. 4. In FIG. 3, the upper platen subassembly 24 is shown to include a support portion 24a which forms part of the permanent platen assembly, having removably secured therebeneath, as by bolts, a hollow water manifold 24b and a cooperative female die grouping 24c. Similarly, lower platen subassembly 26 includes permanent support portion 26a above which is mounted a hollow water manifold and a male die grouping 26c. The water manifolds have port arrangements communicating with and through respective female and male members of the dies to apply controlled temperature differentials across the web formed therebetween.

Figure 12:
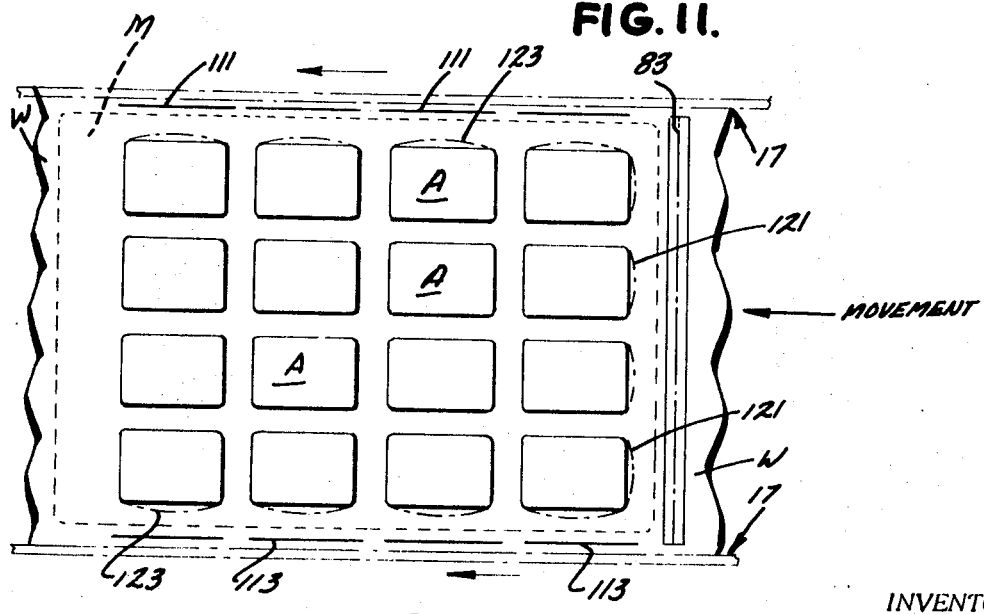
FIG. 12 is a plan schematic view of a portion of web into which articles are being formed and cut, and which is being stressed conditioned according to the invention.

Normally, the two cooperating matching die members include a plurality of interfitting like portions to create a plurality of articles such as open trays, with each stroke of the press. Extending around the periphery of each of these like portions is a peripheral blade-type element 80. This blade and the cooperating blade abutment surface 82 of the adjacent die member have the three fold function of (a) sealing, (b) severing and tab formation, and (c) tab compressing or "creasing." In the particular form of the invention shown, blade 80 is mounted around the peripheral surface of each female die member F and cooperates with the abutment surface 82 adjacent the periphery of the cooperating male die member M. This is true for each die pair in the group which is shown in this embodiment to contain sixteen such pairs (FIG. 12).

This blade 80 and/or the cooperating surface 82 are provided with a plurality of special controlled size recesses. Preferably these recesses are in cooperating surface 82 and are along the side edges of the article being formed, such side edges being parallel to the direction of movement of the web through the press, as indicated by the arrow in FIG. 2. These recesses are preferably not at the forward end of the article, but as illustrated in FIG. 2, on opposite side edges at 84, adjacent the central portions of the sides of the article opposite each other, and toward the rear of the article opposite each other. These depressions have controlled dimensions, although the length dimension normal to the article edges is not critical. The most significant dimension of these recesses is the depth. This depth is a small fraction of the thickness of the plastic foam web to be formed. Normally, the thickness of this foam web is about fifty to sixty thousandths of an inch. The depth of the recess is about six to nine thousandths of an inch, for stock of this type of thickness range, thereby being about 10%–20% of the thickness of the stock. The width of the recesses in the direction of the article edge is preferably about twenty or thirty thousandths of an inch but may vary several thousandths of an inch either way. The reason the length of each recess is not critical is because only the portion directly in line with the blade is effective. As to the width of each recess along the edges of the article, it should be limited to be small enough to enable easy and dependable break out of the article without leaving rough edges on the article, yet be large enough to prevent premature article break out in the press area and assure retention of the article in the web matrix until the break out point is reached after removal from the press. If a greater number of recesses are used than the four illustrated, each may be of relatively less width in accordance with the principles just stated. The depth of the recesses is the most important factor, as noted, and should be only a small fraction of the thickness of the foam sheet material to be treated, so as to cause definite compression of the foam tabs formed at the recesses, which may be considered "creasing" of the foam tabs, during the cutting operation of the remainder of the article periphery.

As noted, the special recesses are preferably in the blade abutment surface. However, it is also possible for them to be also or alternatively in the blade. Thus referring to FIG. 5, the modified blade 80' is shown to have recess 84' of the controlled depth range of about 6–9 thousandths of an inch, as previously noted, formed into it, so that it is about 10%–20% of the stock thickness. The dimension of the recess along the blade (and thus along the article edge) is of the range set forth previously, i.e. about 20–30 thousandths of an inch, plus or minus several thousandths of an inch.

According to this invention, the forming assembly includes special means for stress conditioning each web portion being formed into articles by creating web-tension-absorbing stress relief means in the web during the article forming and cutting operations of the two stage process. Such stress conditioning is achieved at least at the trailing zone of the web portion, i.e. that zone which joints the portion of the web being formed into articles with following portions of the generally continuous web being fed to the forming equipment. Preferably it also includes stress conditioning of the longitudinal side edges of the web, between the articles being formed and the edge gripping and advancing means 17 for the web.

This stress conditioning along the trailing zone of the web portion is achieved with special pleat forming apparatus creating a transverse pleat structure into the web. Similar pleats can also be formed along the opposite side edges of the web, or, since there is frequently too narrow a strip of material along the sides edges, the side edges can be stress conditioned by cutting longitudinally extending elongated, laterally expandable slits adjacent the web gripping and advancing means.

The pleat forming members are configurated in special fashion to create compressed flexible hinge lines at the apices of the pleat, as described in detail below.

More specifically, mounted to the upper and lower platen subassemblies 24 and 26 (FIG. 10) is a pair of pleat forming elements 85 and 87, respectively, each being an elongated element extending transversely across the web, and cooperating to compose pleat forming combination 83 (FIG. 12). These elongated members, being mounted to the platen subassemblies, move toward each other into interfitting web forming relationship with movement of the platens toward each other, during the forming and cutting operations. The components 85 and 87 have interfitting male and female portions, shown with female portion 89 on upper member 85 and male portion 91 on lower member 87. These can be reversed. Female recess 89 constitutes an elongated recess having a generally V-shaped cross section with an apex angle of about 90° or so. The outer underside surface of member 85 is generally flat, except for a pair of elongated protruding pointed shoulders 93 and 93' astraddle of recess 89 and parallel to its apex, to cooperate with the adjacent generally flat surfaces 95 and 95', respectively, of the upper portion of member 87. These surfaces 95 and 95' stradde the elongated male protrusion 91 adapted to project into the recess 89. Protrusion 91 has an apex angle several degrees less than the angle of receiving recess 89 to controllably compress the web in this zone of the pleat, as explained hereinafter.

As dies F and M are shifted toward each other for the forming operation, cooperating members 85 and 87 reform the trailing zone of the web portion into a pleat transversely across the web. These pleat forming members grip the web tightly, also, to prevent the following web stock from being shifted longitudinally or stretched under the forming stresses applied to the web portion in the forming press. The special configuration of protrusion 91 and receiving recess 89 further causes the foam web portion at the apex of the members to be compressed into a solid, generally linear, readily bendable hinge. Further, the cooperation of protruding shoulder edges 93 and 93' and abutting surfaces 95 and 95' compress the foam web in two additional lines to form another pair of bendable hinges parallel to the first hinge. This hinged pleat structure provides a stress relieving area for tensile forces caused by and in the web subsequent to the forming operation, as explained hereinafter, as well as tightly gripping the web during the forming operation. Preferably, cooling conduits 101 and 103 extend through these members so that the temperature can be regulated for optimum web strength and gripping relationship.

Figure 10:
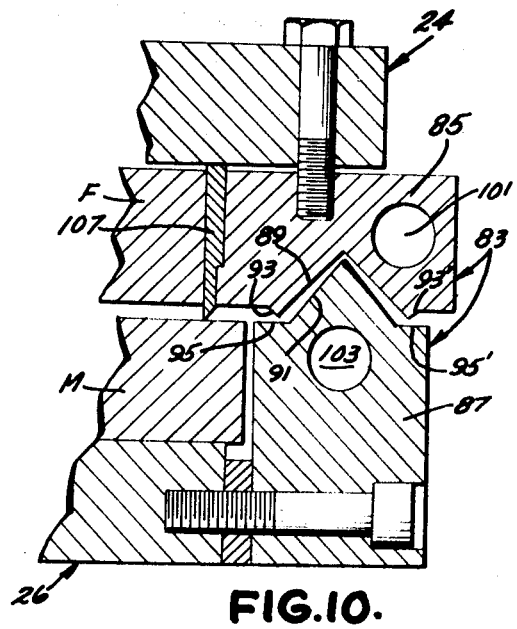
FIG. 10 is a sectional view of the apparatus in FIG. 9, taken on plane X—X.
Figure 11:
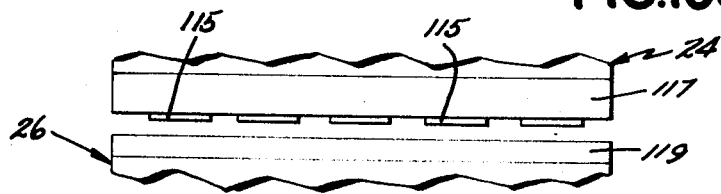
FIG. 11 is an elevational view showing one side of the platen assembly, taken from the direction illustrated by arrow XI in FIG. 4.

In addition to this pleat forming mechanism 83, a transverse blade 107 shown in phantom in FIG. 10 may be employed to provide a plurality of spaced, transverse, expandable, stress-absorbing slits across the web. This is not normally necessary due to the unique pleat structure at this crucial rear edge. In addition, although the pleat forming mechanism of the type illustrated at 83 may be employed longitudinally of the web along the opposite side edges adjacent web gripping and advancing means 17, the lesser stress conditioning that may be desirable along these side edges may be provided with the creation of spaced elongated expandable slits shown at 111 and 113 in FIG. 12, due to the limited space available and the fact that the stresses along the side edges are not severe as along the rear edge upon release of the forming mechanism. These may be formed by spaced, longitudinally extending blades 115 (FIG. 4) mounted in suitable mounts 117 to the upper platen subassembly 24, and cooperative with abutting surfaces or members 119 mounted immediately therebelow to the lower platen subassembly 26. As shown in FIG. 11, these blades are at spaced intervals substantially along the length of the forming platens, so that slits 111 and 113 (FIG. 12) extend substantially the length of the platens, e.g. platen M shown in dotted line, to extend along the length of the web portion being formed into articles.

Operation of the equipment and practice of the method involve steps of sealing, forming, cutting, compressing, and stress conditioning, as follows. The web stock W, which is normally around fifty to sixty thousandths of an inch in thickness, is preferably preheated in an oven subassembly 14 prior to entry between the two platens 24 and 26. The web is intermittently advanced a portion at a time so that each portion will be stationary in the forming equipment while being acted on by the platens to form articles. The platens are spaced from each other while a portion of the web is advanced between them, and then are shifted together. Lower platen 26 may be elevated by extension of fluid cylinder 102 to straighten the toggle linkage and elevate the lower platen. The upper platen is lowered a controlled amount by extending fluid cylinder 62 to extend the upper linkage to a position about like that illustrated in FIG. 1, i.e. where the links are not yet in the fully extended relationship. The stabilizer linkage employed with the upper assembly causes the platen to move straight down so that the periphery of each blade 80 basically seals off but does not sever through the periphery of the web retained by cooperating abutment surface 82, to enable a pneumatic pressure differential and/or a physical pressure or force differential (usually both on foam type web stock) to be applied to the web to force it into the shape of the three dimensionally configurated articles, usually a tray type structure. Each blade 80, in this sealing action, is pushed into the web about the amount of the depth of the recesses to obtain an effective seal. Actually, even if the blade is not inserted to this depth, leakage through these recesses is only minor and insignificant. As the press platens move to this position, pleat forming members 85 and 87 move together sufficiently to grip the web at the transverse trailing zone between the web portion being formed and the following generally continuous web stock to prevent forming stresses from stretching or otherwise distorting subsequent web material. Also, they force this zone into a pleat.

If both physical force (caused by the matching die members) and fluid force (e.g. air pressure) are employed to create the pressure differential as usual, the physical force occurs as the platens move into mating relationship, while the fluid pressure is applied after sealing by blades 80. The fluid pressure is particularly effective to perfect the details of the articles being formed. Fluid pressure can be applied across the web by suitable pressurizing equipment communicating to one platen and evacuating equipment to the other platen (not shown) i.e. communicating with each die cavity by suitable passages 25 and 27 (FIG. 3) or by porous members.

After the articles are formed into the web, the second cylinder 64 of the piggy-back arrangement 56 is extended to cause complete lowering of upper platen 24, thereby lowering blades 80 to peripherally cut clear through the web, as illustrated in FIG. 7, except that, at the recesses, the foam web is squeezed and forced down into the recess as illustrated in FIG. 8, to create a "creased-web" tab, i.e. a compressed tab which is not severed. Thus, the entire periphery of the article is severed free of the web matrix surrounding it, except for the creation of the plurality of small tabs about twenty thousandths of an inch in width which are creased and compressed to a thickness of only a small fraction of the original foam web thickness, e.g. about eight thousandths of an inch to flatten the cells. These tabs are fairly brittle and fragile, to be capable of being readily broken.

As the press closes further in the second stage just noted, pleat forming members 85 and 87 also shift closer together, to compress the web on the three transverse apex lines to form bendable hinges in the foam web. Further, blades 115 cut spaced longitudinal slits 111 and 113 along the opposite side edges of the web, adjacent the outermost articles A being formed and between these articles and the elongated gripping and advancing mechanisms 17. These stress relieving and conditioning functions are particularly significant when forming foam type web stock. This is because, when foam stock is formed into articles, the tensile stresses applied to the web material during forming causes the web to try to restore its original condition and relax the tension after the dies are retracted. This causes the web matrix to tend to pull away from the articles, especially in a longitudinal direction along the noted transverse trailing zone, but also laterally along the side edges which are held by the gripping and advancing means 17. This web retraction tends to pull the web away from the relatively more rigid adjacent articles held only by the tabs, in the fashion shown in exaggerated manner by curved phantom lines 121 and 123 in FIG. 12. Such stress and movement tends to prematurely break the retaining tabs holding the articles A in position in the web, and tends to cause the articles to tilt, and protrude undesirably. These factors can prevent dependable operation since articles can become crushed and jammed in the equipment. Moreover, the articles shift out of proper orientation and registry, thereby causing serious difficulties in controlled web and article advancement and in downstream automatic stackers.

It has been discovered that the disclosed stress conditioning alleviates the problem. The hinged pleat allows relaxation of the substantial longitudinal tension by web lengthening upon opening of the press. The slits allow relaxation of lesser lateral tension by widening under the tension.

With opening of the platens, therefore, the tensions are relaxed, and the web matrix articles are advanced out of the press by chain feed means 17 and pulling feed rolls 100 and 102. The web matrix W' is pulled around roller 122. As the articles advance along surface 118, the web matrix and articles cool to near ambient temperatures. This causes the compressed tabs to become relatively more brittle to enable clean simple breakage thereof. The front end of the articles A have no tabs adjacent them so that, when the web matrix is pulled around 122, the forward end of the article will protrude from the web as illustrated in FIG. 1. The break out surface means, e.g. conveyor belt 110, is positioned immediately adjacent the break out roller 122 to cause the stiffened three dimensional article to follow a generally planar or linear path as the web is pulled in its non-linear path around the roll. When the forward end of the article is braced against the break out surface means, the middle portion of the article reaches the arcuate surface of roll 122 which causes a breakage of the creased and more brittle central tabs between the articles and web. As the rear portion of the article approaches the arcuate surface, the second set of tabs is broken, with the matrix being continuously advanced down the scrap cutter 106 while the articles proceed on break out surface means 110 to subsequent stations such as stacking means. The separated articles have a clean peripheral edge.

The advantages of the invention are obviously many. It is also conceivable that certain minor deviations from the general construction employed in the environment of this invention can be varied considerably to suit a particular purpose, set up, machine arrangement, product, or the like.

The embodiments of this invention in which an exclusive property or privilege is claimed are defined as follows.

1. A forming die assembly for forming articles in a generally continuous web of foam plastic, comprising: die forming means including first and second cooperative die forming elements movable toward each other into cooperative relationship, to form a foam web segment into a three dimensional article, peripheral blade means around one of said elements and shiftable to cut through the foam web around a formed article, a cooperative blade abutment surface on the other element, web segment compression means comprising shallow recess means in at least one of (a) said blade and (b) said blade abutment surface, having a depth which is only a small fraction of the thickness of the foam web, to cause the peripheral severance of a formed foam article to be discontinuous, and with the foam web segments separating the discontinuous cuts being compressed, and transverse pleat forming means adjacent said forming elements, cooperative with each other during movement of said forming elements toward each other to form tension stress-absorbing pleat structure with release of said die forming means from the web.

2. The assembly in claim 1 wherein said pleat forming means are configurated to form compressed hinge lines into the foam web at the pleat apices.

3. The assembly in claim 1 including web gripping and pulling means along the opposite side edges to intermittently advance the web in a forward direction out of said die forming means, and including longitudinal web slitting means adjacent said forming elements and said web gripping means, mounted to cut stress-relieving slits in the web during cutting of the web by said peripheral blade means.

4. A forming die assembly for forming articles in a generally continuous web of foam plastic, comprising: die forming means including first and second cooperative die forming elements movable toward each other into operative relationship, to form a foam web segment into a three dimensional article, peripheral blade means around one of said elements and shiftable to cut through the foam web around a formed article, a cooperative blade abutment surface on the other element, web segment compression means comprising shallow recess means in at least one of (a) said blade and (b) said blade abutment surface, having a depth which is only a small fraction of the thickness of the foam web, to cause the peripheral severance of a formed foam article to be discontinuous and with the foam web segments separating the discontinuous cuts being compressed, and special means adjacent said forming elements for creating stress relief features in the web during the forming and cutting steps.

5. The assembly in claim 4 wherein said special means includes web slitting means located with respect to said forming elements to slit peripheral zones of each said web segment during cutting of the web by said peripheral blade means.

6. The assembly in claim 4 wherein said special means includes means for forming pleat structure in the web.

7. The assembly in claim 1 wherein said shallow recess means has a depth of several thousandths of an inch.

8. The assembly in claim 4 wherein said shallow recess means have a depth which is about 10% to 20% the thickness of said foam web.

9. The assembly in claim 4 wherein said shallow recess means has a depth of several thousandths of an inch.

References Cited

UNITED STATES PATENTS

| | | | |
|---|---|---|---|
| 3,105,270 | 10/1963 | Fibish | 18—19 F |
| 3,145,895 | 8/1964 | Reifers | 93—58.3 FX |
| 3,166,790 | 1/1965 | Keyes | 18—19 F |
| 3,255,649 | 6/1966 | Buttery | 83—9 |
| 3,359,600 | 12/1967 | O'Brien et al. | 18—7 FMX |

J. SPENCER OVERHOLSER, Primary Examiner

R. L. SPICER, JR., Assistant Examiner

U.S. Cl. X.R.

18—1 R, 19 H; 83—9, 695; 93—58.3